United States Patent
You et al.

(10) Patent No.: US 11,403,749 B2
(45) Date of Patent: Aug. 2, 2022

(54) METHOD OF IDENTIFYING INSULATION VOIDS AND INSULATION VOID DETECTION TOOL

(71) Applicant: CertainTeed LLC, Malvern, PA (US)

(72) Inventors: Sizhu You, Auburndale, MA (US); Todd P. Dinoia, Littleton, MA (US)

(73) Assignee: CertainTeed LLC, Malvern, PA (US)

( * ) Notice: Subject to any disclaimer, the term of this patent is extended or adjusted under 35 U.S.C. 154(b) by 0 days.

(21) Appl. No.: 16/988,533

(22) Filed: Aug. 7, 2020

(65) Prior Publication Data

US 2021/0042911 A1 Feb. 11, 2021

Related U.S. Application Data

(60) Provisional application No. 62/884,945, filed on Aug. 9, 2019.

(51) Int. Cl.
*G06T 7/00* (2017.01)
*G06T 7/50* (2017.01)
(Continued)

(52) U.S. Cl.
CPC .............. *G06T 7/0004* (2013.01); *G06T 7/11* (2017.01); *G06T 7/50* (2017.01); *H04N 5/33* (2013.01);
(Continued)

(58) Field of Classification Search
CPC ............ H04N 5/33; G06T 2207/10012; G06T 2207/10048; G06T 2207/20021;
(Continued)

(56) References Cited

U.S. PATENT DOCUMENTS 4,208,126 A * 6/1980 Cheo .................... G01N 21/88
356/73.1
8,086,042 B2 * 12/2011 Fellinger ................ G01N 25/72
382/218
(Continued)

FOREIGN PATENT DOCUMENTS

WO 2019129959 A1 7/2019

OTHER PUBLICATIONS

Brand Instruments, Inc. testa 875-881 Thermal Imager Camers. http://www.bandtinst.com/testo/IR%20Thermal%20Imaging/testo_875-881_Thermal_Imaging. 2002.
(Continued)

*Primary Examiner* — Bobbak Safaipour
(74) *Attorney, Agent, or Firm* — McDonnell Boehnen Hulbert & Berghoff LLP

(57) ABSTRACT

The present disclosure relates generally to evaluating thermal properties of building surfaces. The present disclosure relates more particularly to a method of evaluating insulation in a cavity in a building surface. The method includes obtaining an infrared image of a first area of the building surface that covers the cavity, where the infrared image includes an array of digital pixel values. The infrared image is partitioned into a plurality of regions based on the digital pixel values. A shape of a first identified region is determined using a shape analysis algorithm and whether the first identified region corresponds to a first insulation void is recognized based on the determined shape of the first identified region.

19 Claims, 9 Drawing Sheets

(51) Int. Cl.
*G06T 7/11* (2017.01)
*H04N 5/33* (2006.01)

(52) U.S. Cl.
CPC .............. *G06T 2207/10048* (2013.01); *G06T 2207/20021* (2013.01); *G06T 2207/30108* (2013.01)

(58) Field of Classification Search
CPC . G06T 2207/30108; G06T 2207/30184; G06T 7/0004; G06T 7/11; G06T 7/136; G06T 7/50
See application file for complete search history.

(56) References Cited

U.S. PATENT DOCUMENTS

| | | | | |
|---|---|---|---|---|
| 2007/0087311 | A1* | 4/2007 | Garvey, III | G01J 5/025 434/21 |
| 2008/0224041 | A1* | 9/2008 | Cannamela | G01V 9/005 374/124 |
| 2010/0107767 | A1* | 5/2010 | Kane | G01N 25/72 73/592 |
| 2010/0296694 | A1* | 11/2010 | Little | G01K 17/00 382/100 |
| 2013/0088604 | A1* | 4/2013 | Hamrelius | H04N 5/33 348/164 |
| 2016/0006951 | A1* | 1/2016 | Moghadam | G06T 7/593 348/164 |
| 2017/0080614 | A1 | 3/2017 | Lamm | |
| 2020/0149297 | A1 | 5/2020 | You et al. | |
| 2021/0042911 | A1* | 2/2021 | You | G06T 7/136 |

OTHER PUBLICATIONS

Adams, N. What Infrared Camera Testing Looks Like (On My Own Home), http://energysmartohio.com/uncategorized/what-infrared-camera-testing-looks-like-on-my-own-home/. Nov. 1, 2014.

FLIR Systems, Inc. Thermal Imaging Guidebook for Facilities Maintenance, pp. 1-26. 2016.

Infrared Building Inspections and Energy Audits. Using Infrared Camera Technology to Detect Insulation Voids. https://infraredenergyinspections.wordpress.com/2010/01/20/using-infrared-camera-technology-to-detect-insulation-voids/. Jan. 20, 2010.

* cited by examiner

METHOD OF IDENTIFYING INSULATION VOIDS AND INSULATION VOID DETECTION TOOL

CROSS-REFERENCE TO RELATED APPLICATIONS

This application claims the benefit of priority of U.S. Provisional Patent Application No. 62/884,945, filed Aug. 9, 2019, which is hereby incorporated herein by reference in its entirety.

BACKGROUND OF THE DISCLOSURE

1. Field of the Disclosure

The present disclosure relates generally to evaluating thermal properties of building surfaces for example, to identify the quality of insulation in the building surface. The present disclosure relates more particularly to a method of identifying insulation voids in a cavity in a building surface, a tool for identifying insulation voids, and a method of insulating a building surface cavity using such a tool.

2. Technical Background

Heating and cooling of buildings uses approximately 35% of all the energy consumed in the United States of America (USA). When buildings are well insulated, the energy costs can be substantially reduced. For example, new buildings including various recent innovations and modern materials use less than half the energy per square foot of older buildings.

Typical insulating materials used in building insulations include solid rigid foam insulating boards, fibrous insulation, and spray or injection foams. Rigid foam insulating boards are composed of small, individual cells separated from each other. The cellular material may be glass or foamed plastic, such as polystyrene, polyurethane, polyisocyanurate, polyolefin, and various elastomeric materials. Fibrous insulation is composed of small-diameter fibers, which finely divide the air space. Examples of fibrous insulation include fiberglass and mineral wool type insulations. Foam-in-place insulation includes liquid foams that are sprayed, injected, or poured in place. In one example, spray or injection polyurethane foams a two-component mixture composed of isocyanate and polyol resin are mixed near the tip of a gun. The two most common methods of mixing are impingement mixing (also known as a "high pressure" system), in which two streams of material impact each other under high pressure, and static mixing (also known as a "low pressure" system), in which the two streams of material are interlaced using a series of mixing elements. After ejection from the gun, the mixed partially expanded material forms an expanding foam that is sprayed onto roof tiles, concrete slabs, into wall cavities, or through holes drilled into a cavity of a finished wall. Once in place, the mixed foam fully expands. In closed-cell foam, the high-density cells are closed and filled with a gas that both enhances insulation value and helps the foam expand to fill the spaces around it. Open-cell foam cells are not as dense as the closed-cell foams and are filled with air, which gives the insulation a spongy texture.

In a typical liquid foam injection process, four or more holes are drilled on the interior or exterior of each cavity within the building, and then a 6" tube is inserted into these holes and a shot of foam is injected and falls to the bottom of the cavity. After the foam has fully expanded and is tack free, a second shot can be injected above the first shot. Each layer of foam is called a "lift". A typical 14.5" wide×8' high cavity is filled with 3 to 4 lifts of foam.

Even when using modern insulation techniques and materials, it is possible that voids may form or develop in the insulation. If the volume of the void(s) is sufficient, it can substantially impact heat transfer through the insulated structure. Accordingly, voids that are substantial should be addressed. However, identifying and assessing insulation voids is challenging. While certain tools can be used to view variances in insulation, such as infrared imaging, these tools do not identify whether the variances are actually representative of voids and give no indication of the volume of the voids. Accordingly, most insulation analysis is subjective, which can result in missing relevant voids or identifying false positives. For example, a user may mistakenly identify a knit line between sections of foam insulation as a void. Likewise, the subjective analysis of a user may incorrectly identify plumbing or framing elements as voids.

The present inventors have recognized that an objective method of identifying insulation voids within a cavity of a building surface would be advantageous to builders and customers.

SUMMARY OF THE DISCLOSURE

In one aspect, the present disclosure provides a method of evaluating insulation in a cavity in a building surface, the method comprising:
  receiving, via a computing device, an infrared image of a first area of the building surface that covers the cavity, the infrared image including an array of digital pixel values;
  partitioning, using the computing device, the infrared image into a plurality of regions based on the digital pixel values, the plurality of regions including a first identified region;
  determining, using the computing device, a shape of the first identified region using a shape analysis algorithm; and recognizing, using the computing device, that the first identified region corresponds to a
  first insulation void based on the determined shape of the first identified region.

In another aspect, the disclosure provides non-transitory computer-readable medium having stored thereon program instructions that upon execution by a processor, cause performance of a set of operations to perform the method of evaluating insulation in a cavity behind a building surface according to the disclosure.

In another aspect, the disclosure provides a computing device comprising:
  a processor; and
  a non-transitory computer-readable medium having stored thereon program instructions that upon execution by the processor, cause performance of a set of operations to perform the method of evaluating insulation in a cavity in a building surface according to the disclosure.

In another aspect, the disclosure provides an insulation void detection tool comprising:
  a housing;
  a thermographic camera disposed in the housing and configured to capture an infrared image of a building surface; and
  the computing device according to the disclosure.

In another aspect, the disclosure provides a method of insulating a cavity in a building surface, the method comprising:

aiming the thermographic camera of the insulation void detection tool according to the disclosure toward a first area of a building surface that covers the cavity;

activating the thermographic camera of the insulation void detection tool to capture an infrared image of the first area of the building surface;

receiving an indication of a first identified region of the infrared image that corresponds to a first insulation void within the cavity of the building surface.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

As described above, the present inventors have determined that an objective method of identifying insulation voids within a cavity of a building surface would be advantageous to builders and customers.

Accordingly, one aspect of the disclosure is a method of evaluating insulation in a cavity in a building surface. The method includes receiving, via a computing device, an infrared image of a first area of the building surface that covers the cavity, where the infrared image includes an array of digital pixel values. Using the computing device, the infrared image is partitioned into a plurality of regions based on the digital pixel values, where the plurality of regions includes a first identified region. The method further includes determining, using the computing device, a shape of the first identified region using a shape analysis algorithm. Using the computing device, the first identified region is then recognized as corresponding to a first insulation void based on the determined shape of the first identified region.

The term "pixel", as used herein, refers to a subsection of an image received by the camera, where the image is formed by an array of pixels. The digital representation of the image is formed by an array of values, each of which is a representation that may indicate light intensity and, in some embodiments color, and corresponds to a pixel of the image. The term "digital pixel value," as used herein, refers to a value associated with a subsection of the image and is based on the values of the pixels of the image. For example, in some embodiments, the digital pixel values directly correspond to the values of each pixel in the image. In other embodiments, the digital pixel values correspond to a group of pixels at the subsection of the image. For example, in some embodiments the digital pixel value corresponds to an average value of a group of pixels. In other embodiments, the digital pixel values correspond to values generated by a filtering operation of several pixels at the image subsection. For example, the digital pixel values may correspond to a weighted average of the value of pixels at the image subsection.

The term infrared image as used herein refers to an image that is captured using a sensor that is sensitive to wavelengths of electromagnetic radiation in the infrared range, e.g., from 700 nm to 20 microns, or higher. In some embodiments, the infrared image incorporates image information related to wavelengths in a range of 780 nm to 2500 nm.

In certain embodiments of the method of evaluating insulation as otherwise described herein, the building surface is the surface of an internal wall of the building. For example, in some embodiments, the building surface is a wall formed by panels. In other embodiments, the building surface is a ceiling surface. Still, in other embodiments, the building surface is a floor surface. Other building surfaces are also possible.

Figure 1:
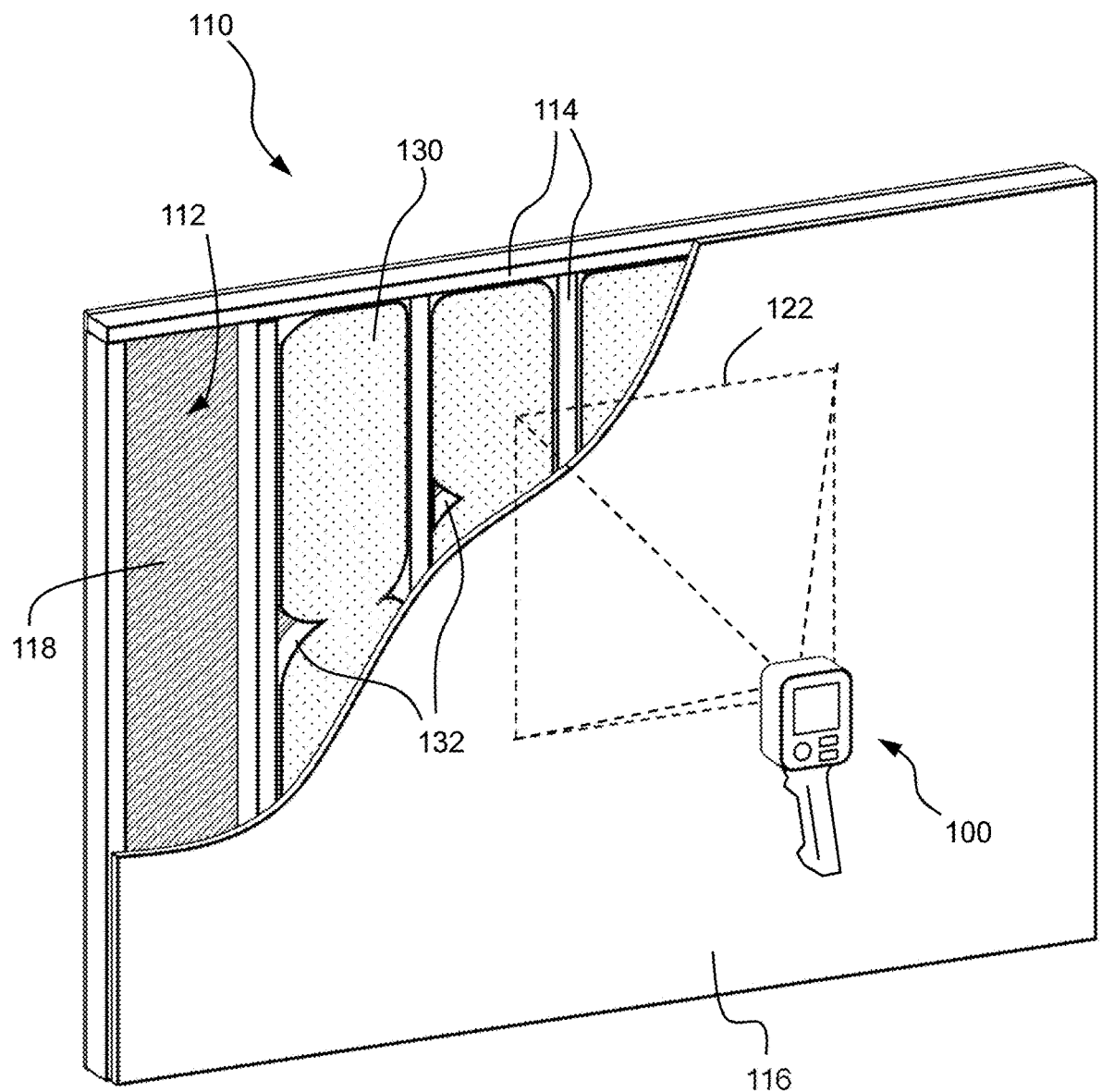
FIG. 1 is a schematic perspective view of a method of evaluating insulation in a cavity in a building surface according to an embodiment of the disclosure.
Figure 2:
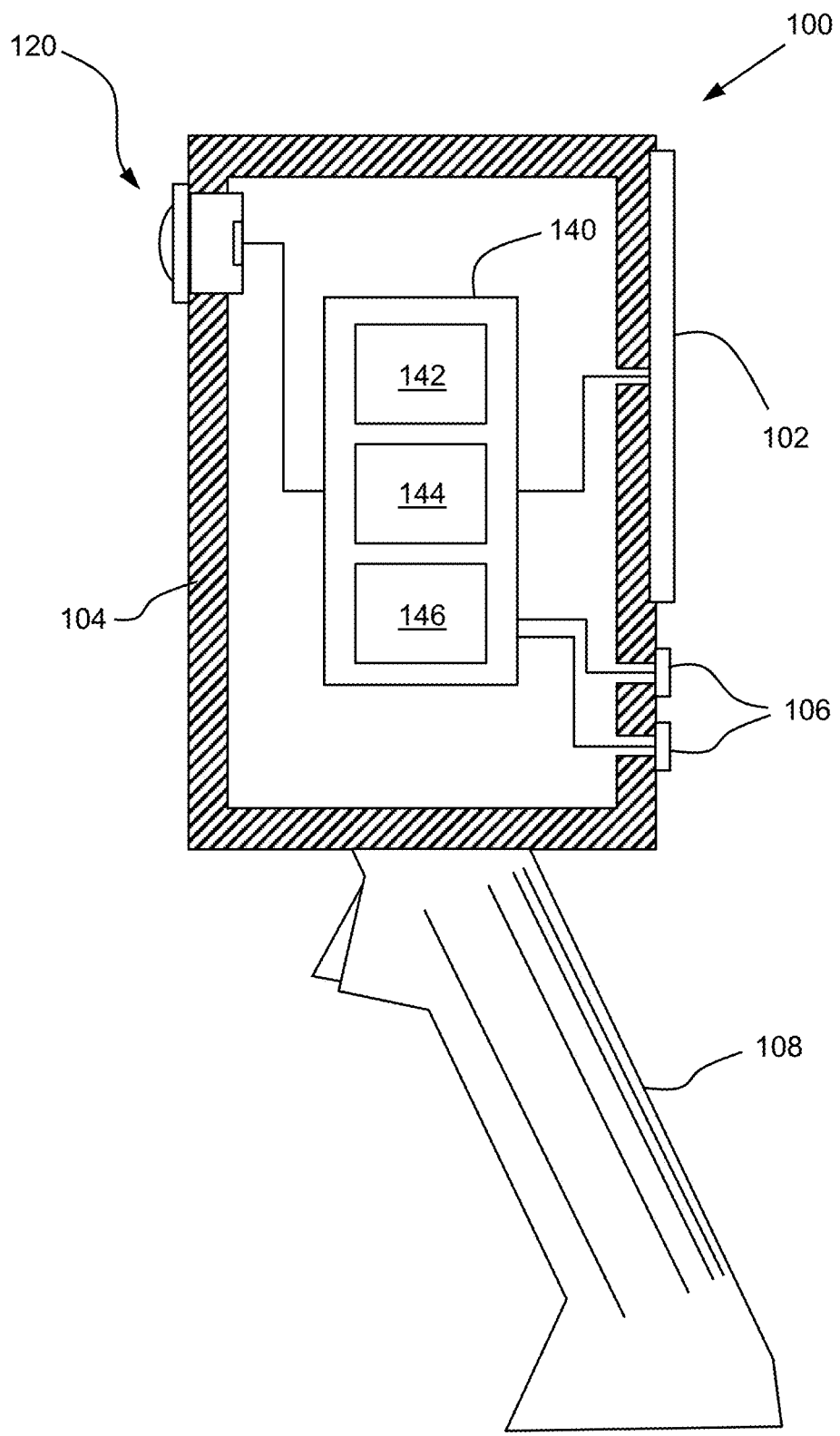
FIG. 2 is a cross sectional side view of an insulation void detection tool according to an embodiment of the disclosure.

FIGS. 1 and 2 illustrate the use of an insulation void detection tool in a method of the disclosure. FIG. 1 shows the insulation void detection tool 100 positioned to capture an image of a building surface 110 having a cavity 112 therein. As shown in FIG. 2, insulation void detection tool 100 includes a thermographic camera 120 configured to capture an infrared image and a computing device 140 configured to analyze the infrared image. Referring again to FIG. 1, the insulation void detection tool 100 is positioned to place the field of view 122 of the infrared camera over an area of the building surface 110. Building surface 110 is a wall that includes framing elements 114 that support a first wall panel 116 and a second wall panel 118. As will be appreciated by those of ordinary skill in the art, the framing elements may include joists or studs, for example, made of wood or steel. Further, the first wall panel may be a drywall panel for example, made of a gypsum product, and the second wall panel may be an exterior sheathing. In other embodiments the building structure has another configuration.

Building surface 110 includes a cavity 112 defined between the first wall panel 116 and the second wall panel 118. Cavity 112 is also confined by the framing elements 114. In some embodiments, the cavity is also be bordered by a floor surface. Further, in some embodiments, the cavity is bordered by a ceiling structure. In some embodiments, the cavity is substantially enclosed by the surrounding building surface structure. For example, in some embodiments the cavity is at least 95% surrounded by the building surface structure. In other embodiments, the cavity is open on one end. For example, in some embodiments, the top of the cavity is open. Cavity 112 is filled with insulation 130. No insulation is shown in the far left section of building surface 110 so that the cavity 112 and second wall panel 118 are visible. In certain locations within cavity 112, a void 132 is formed in the insulation 130.

In certain embodiments, the insulation undergoes an exothermic reaction when it is first introduced into the cavity in the building surface. For example, in a typical liquid foam injection process, apertures are drilled on the interior or exterior of each cavity within the building surface, and then a tube is inserted into these holes and a shot of foam is injected and falls to the bottom of the cavity. After the foam has fully expanded and is tack free, a second shot can be injected above the first shot. Each layer of foam is called a "lift". A typical 14.5" wide×8' high cavity is filled with three to four lifts of foam. As the foam cures within the cavity, it heats up in an exothermic reaction. In some embodiments, the foam heats to a temperature that is elevated by a range of 5° F. to 60° F. compared with the ambient temperature.

If the infrared image is captured by the insulation void detection tool while the exothermic reaction is ongoing, the infrared image will capture the temperature profile across the first area of the building surface resulting from the heat emitted by the insulation. In particular, areas within the cavity that include the warm insulation will produce regions within the image with higher digital pixel values. From the captured infrared image, insulation voids can be detected by the insulation void detection tool.

While the exothermic reaction of foam insulation provides excellent variance in the infrared image for detecting the locations of the insulation within the cavity, in other embodiments, the location of the insulation is determined by measuring heat transfer through the building surface. For example, if there is temperature differential between a first environment on one side of the building surface and a second environment on the opposite side of the building surface, any variances in the thermal conductivity of the building surface will result in a fluctuating heat transfer profile across the plane of the building surface. An infrared image of the building surface is able to detect the variations in the amount of thermal energy being transferred through the building surface at different positions. For example, the framing elements may be more conductive than the insulation and can be easily identified by the significant change in the thermal radiation captured by the infrared image at the location of the framing elements. Likewise, variances in the insulation, and particularly voids in the insulation, will also result in variances in the thermal radiation captured by the infrared image. Thus, through analysis of the infrared image, the variations in the conductivity through the building surfaces can be identified, and the sources of that variation can be determined.

Figure 3:
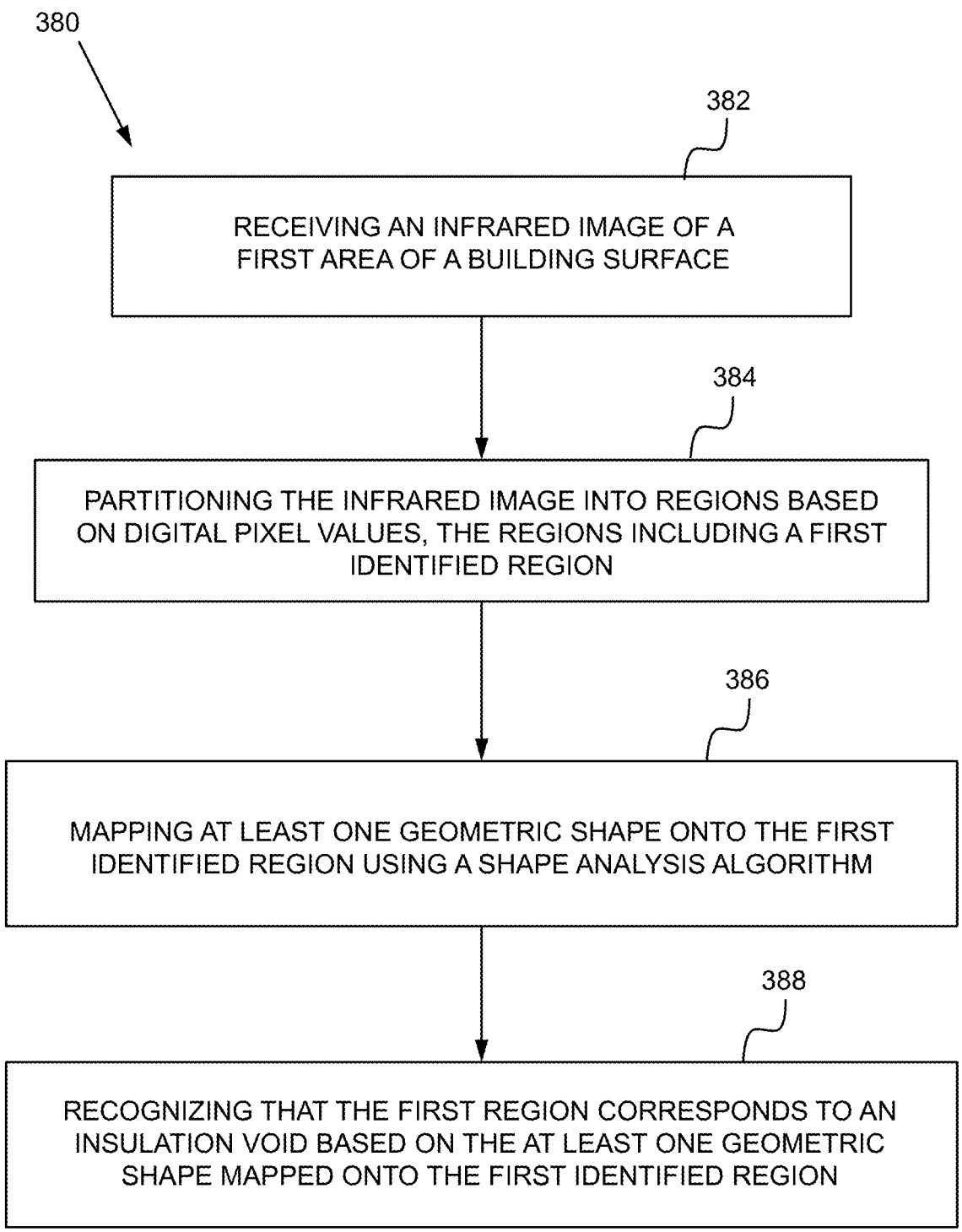
FIG. 3 is a flow chart of a method according to an embodiment of the disclosure.

FIG. 3 illustrates a flow chart of a method 380 according to an embodiment of the disclosure. At block 382, method 380 includes receiving an infrared image of the first area of the building surface. For example, as shown in FIG. 1, the insulation void detection tool 100 is positioned to aim the thermographic camera toward the building surface 110 and capture an infrared image of the first area 122 of the building surface.

At block 384, method 380 includes partitioning the image into regions based on digital pixel values, where the regions include a first identified region. For example, in some embodiments, the computing device uses an algorithm to binarize the image in order to separate dark regions from light regions. In order to binarize the image, in some embodiments, a threshold is determined to define the light regions and dark regions. The computing device may use one or more auto thresholding methods in order to determine a suitable threshold, as will be appreciated by those of ordinary skill in the art. There are many auto thresholding methods that may be used. Examples of auto thresholding methods include Huang's fuzzy thresholding method, Otsu's thresholding method, Li's minimum cross entropy thresholding, intermode methods, moment-preserving thresholding, and others.

At block 386, method 380 includes mapping at least one geometric shape onto the first identified region using a shape analysis algorithm. For example, in some embodiments, the computing device identifies one or more rectangle, triangle, arc, or line defined by the identified regions, and maps the geometric shape onto the corresponding regions of the image. In order to identify the shapes, in some embodiments, the computing device uses one or more shape analysis algorithms. In certain embodiments the shape analysis algorithms use geometric patterns to identify the shapes, such as circumference to area ratio, aspect ratio, or similar parameters. Complex shape analysis algorithms may be used and are known to those of ordinary skill in the art. Examples of descriptions of such shape analysis algorithms are included, for example, in Sven Loncaric, A survey of shape analysis techniques, Pattern Recognition, Volume 31, Issue 8, 1998, and Costa, Luciano da Fontoura Da, and Roberto Marcondes Cesar Jr., Shape analysis and classification: theory and practice, CRC Press, Inc., 2000.

At block 388, method 380 includes recognizing that the first region corresponds to an insulation void based on the at least one geometric shape mapped onto the first identified region. For example, as explained in more detail below, in some embodiments, if the first region includes a triangular portion, the computing device recognizes the first region as including an insulation void.

Figure 4:
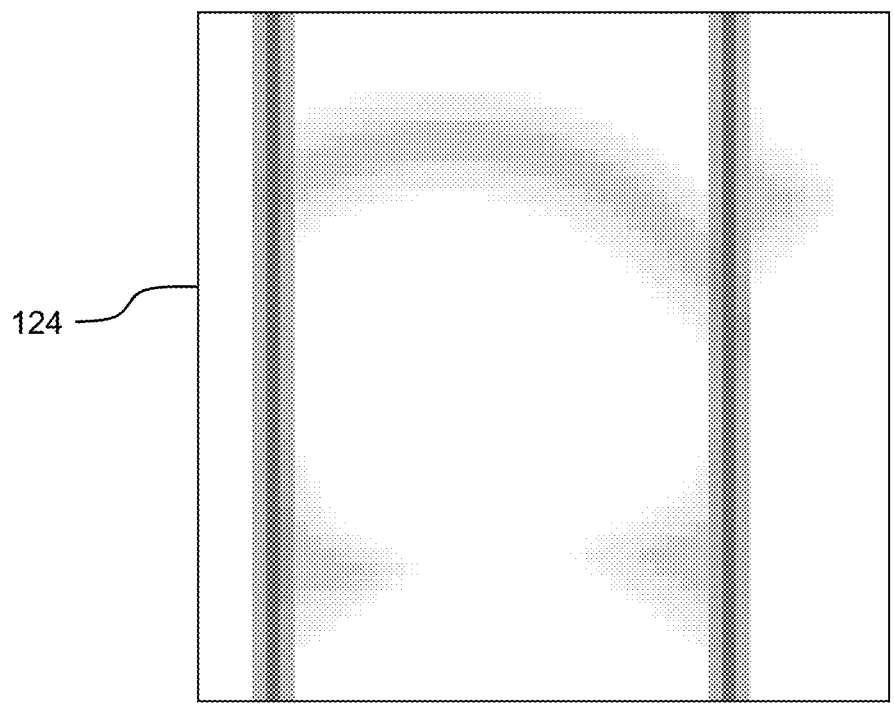
FIG. 4 is a schematic representation of an infrared image of an area of a building surface according to an embodiment of the disclosure.

FIG. 4 illustrates a schematic representation of an infrared image 124 captured from the field of view 122 of the thermographic camera 120 of insulation void detection tool 100 shown in FIG. 1. The infrared image 124 includes an array of digital pixel values and identifies variations in the thermal energy radiated from building surface 110. The variations in the infrared image 124 are characterized by differences in the digital pixel values of the image. For example, the infrared image 124 includes two rows that extend over the height of the image that have digital pixel values that are lower than the rest of the image, as represented by darker coloration. The two rows represent the location of framing members of building surface 110 as explained in more detail below. While infrared image 124 has a relatively low pixel density, in other embodiments, the image may include many pixels, for example, millions of pixels.

Figure 5:
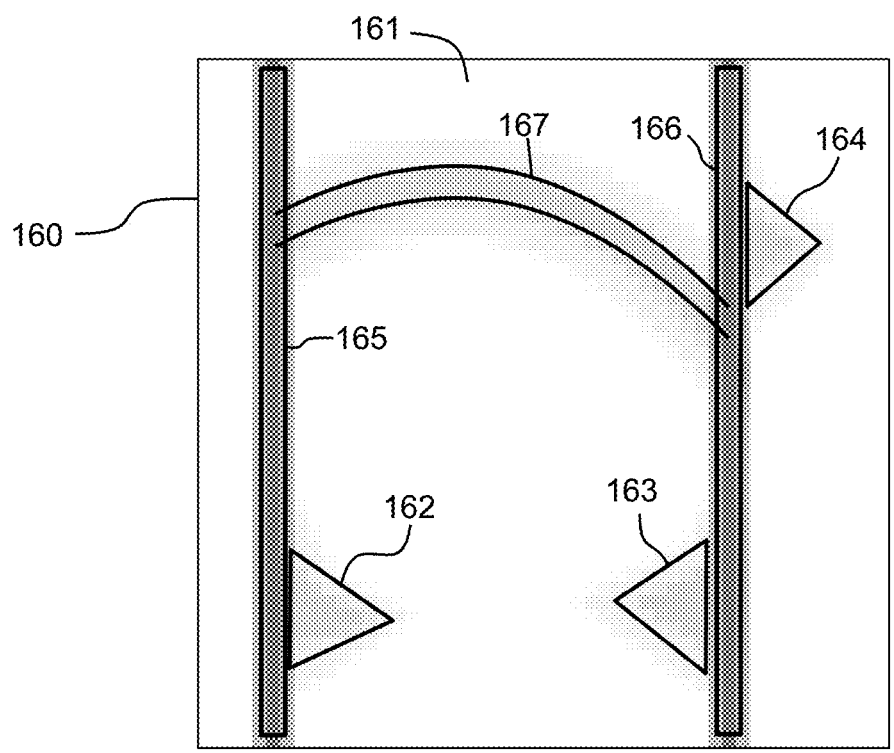
FIG. 5 is a schematic representation of an analysis of the infrared image of FIG. 4 according to an embodiment of the disclosure.
Figure 6:
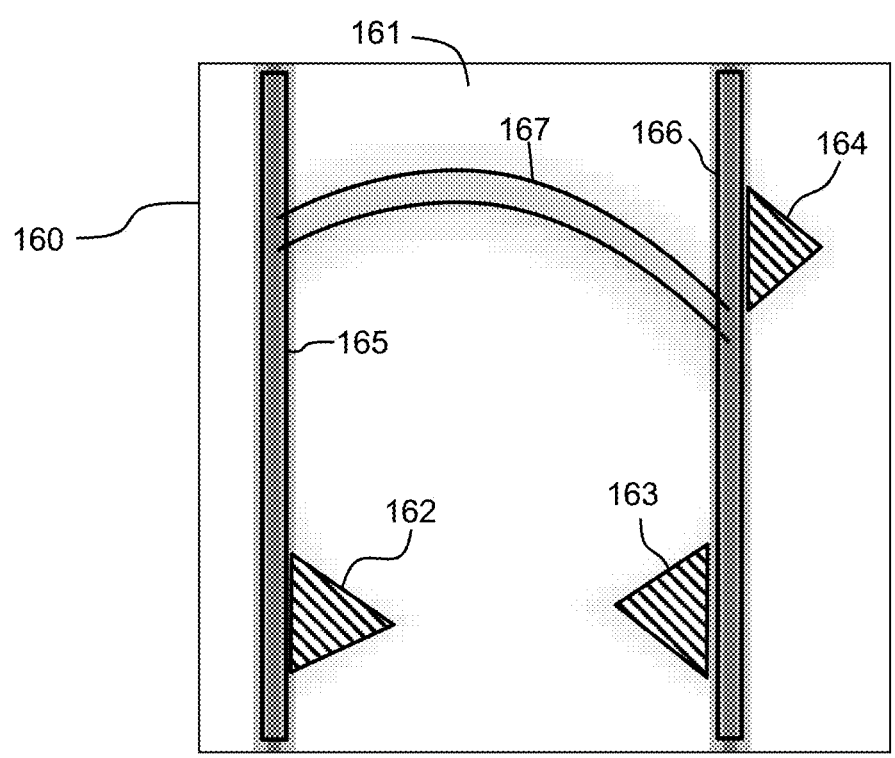
FIG. 6 is a schematic representation of further analysis of the infrared image of FIG. 4 according to an embodiment of the disclosure.

FIG. 5 illustrates a schematic representation of an analyzed infrared image 160, after an analysis has been performed by computing device 140 to partition the infrared image 124 into a plurality of regions 161, 162, 163, 164, 165, 166, 167 based on the digital pixel values and their positioning near other pixels having similar digital pixel values. The majority of analyzed infrared image 160 is partitioned into a first region 161 and is comprised of areas with high digital pixel values. In some embodiments, as in analyzed infrared image 160, the pixels having digital pixel values at or near the most common value are partitioned into a single region, that may or may not be divided by other regions. In other embodiments, the pixels having digital pixel values at or near the most common value are partitioned into separate continuous regions. Areas of analyzed infrared image 160 with pixels having lower digital pixel values are partitioned into the other regions 162-167. The computing device 140 uses a shape analysis algorithm to determine the shapes of the other regions 162-167. Based on the determined shapes of these regions, as shown in FIG. 6, the computing device 140 identifies regions 162-164 as corresponding to insulation voids, and regions 161, 165, 166, and 167 as not corresponding to insulation voids.

In certain embodiments of the method of evaluating insulation as otherwise described herein, the digital pixel values correspond to brightness. For example, in some embodiments, the digital pixel values correlate with the intensity of thermal energy received by an infrared sensor at a respective pixel. For example, in some embodiments, the digital pixel values correlate with the number of photons detected by the infrared sensor at the respective pixel. In other embodiments, the digital pixel values correspond to another characteristic, such as wavelength of the captured electromagnetic radiation, or a combination of wavelength and intensity.

In certain embodiments of the method of evaluating insulation as otherwise described herein, recognizing that the first identified region corresponds to the first insulation void includes determining that the shape of the first identified region includes a triangular portion. The phrase "includes a triangular portion" refers to regions that are triangular as well as more complex shapes that have a section in the shape of a triangle. For example, some regions that include a triangular portion may have a section with a curved shape or a rectangular shape that overlaps with a section having a triangular shape. In some embodiments, the computing device identifies each of these regions as corresponding to a void. In particular, in some embodiments, the computing device identifies the triangular portion of this shape as corresponding to a void.

In certain embodiments of the method of evaluating insulation as otherwise described herein, recognizing that the first identified region corresponds to the first insulation void includes determining that the shape of the first identified region is a triangle. For example, analyzed image 160 includes region 162, region 163, and region 164, each of which is in the shape of a triangle. Further, computing device 140 identified each of region 162, region 163, and region 164 as corresponding to an insulation void based on these regions being identified as triangles.

In certain embodiments of the method of evaluating insulation as otherwise described herein, the building surface is a wall or ceiling. For example, building surface 110 in FIG. 1 is a wall that includes an interior wall panel 116 and an exterior wall sheathing 118. In other embodiments, the building surface is an interior wall. Still in other embodiments, the building surface is a ceiling, for example a ceiling between two floors of a building, between a room and an attic, or a ceiling between a room and a roof. In other embodiments, the building surface is another part of a building structure.

In certain embodiments of the method of evaluating insulation as otherwise described herein, the method further includes identifying framing elements in the building surface. For example, in the method depicted in FIGS. 4-6, computing device 140 identifies region 165 and region 166, which are in the form of long columns of higher digital pixel values, as studs within building surface 110. In embodiments of the method, the computing device may identify regions as corresponding to framing elements based on their straight edges and/or the uniformity of the digital pixel values within the regions. For example, computing device 140 identifies regions 165 and 166 as studs based on the consistent high digital pixel values and the long straight shape of these regions.

In certain embodiments of the method of evaluating insulation as otherwise described herein, the first identified region is recognized as the first insulation void if the first identified region diverges toward a framing element. In certain building surfaces, insulation voids are more prone to occur near a framing element. For example, friction against the framing element may prevent insulation from moving or expanding into a corner near a framing element. Accordingly, in certain embodiments, the computing device considers the proximity of an identified framing element in making the determination of whether a region corresponds to an insulation void. In particular, in some embodiments, the computing device considers regions that diverge toward a region identified as a framing element in identifying whether the region corresponds to an insulation void.

In certain embodiments of the method of evaluating insulation as otherwise described herein, the first identified region has a first average digital pixel value, wherein the infrared image of the first area of the building surface has an overall average digital pixel value, and wherein a difference between the first average digital pixel value and the overall average digital pixel value is greater than a predetermined threshold. For example, in some embodiments, the computing device partitions the infrared image into regions based on the average digital pixel values of coextensive groups of pixels. Further, the computing device calculates the average digital pixel values of each identified region. The computing device may then consider the difference between the average digital pixel value of the region and the average digital pixel value of the infrared image. In certain embodiments, if the difference between the average digital pixel value of the region and the average digital pixel value of the infrared image is outside of a certain threshold, the computing device may consider this region as a possible void and further analyze the region based on its shape. In other embodiments, the computing device determines whether the regions correlate to voids without considering the average digital pixel value of the region.

In certain embodiments of the method of evaluating insulation as otherwise described herein, the method further includes identifying MEP components in the building surface. For example, in certain embodiments, the computing device identifies certain regions as corresponding to mechanical, electrical or plumbing components within the wall. For instance, in some embodiments, the computing device identifies rectangular regions adjacent to an identified framing element as an electrical box.

In certain embodiments of the method of evaluating insulation as otherwise described herein, the plurality of regions includes a second identified region, and the method further includes determining, using the computing device, a shape of the second identified region using the shape analysis algorithm, and recognizing, using the computing device, that the second identified region does not correspond to an insulation void based on the determined shape of the second identified region. For example, as set forth above, computing device 140 identifies region 165 and region 166 as corresponding to framing elements based, at least in part, on the long straight rectangular shape of these regions. Likewise, computing device 140 also identifies region 167 as not corresponding to an insulation void based on its shape.

In certain embodiments of the method of evaluating insulation as otherwise described herein, recognizing that the second identified region does not correspond to an insulation void includes determining that the shape of the second identified region is an arc. For example, computing device 140 recognizes region 167 of analyzed infrared image 160 as not being an insulation void based on the shape of region 167 being an arc. In certain embodiments, based on the type of insulation used, an arc may represent a seam between two sections of insulation. For example, if the building surface includes foam insulation, an arc may represent where two expanded bodies of insulation meet.

Figure 7:
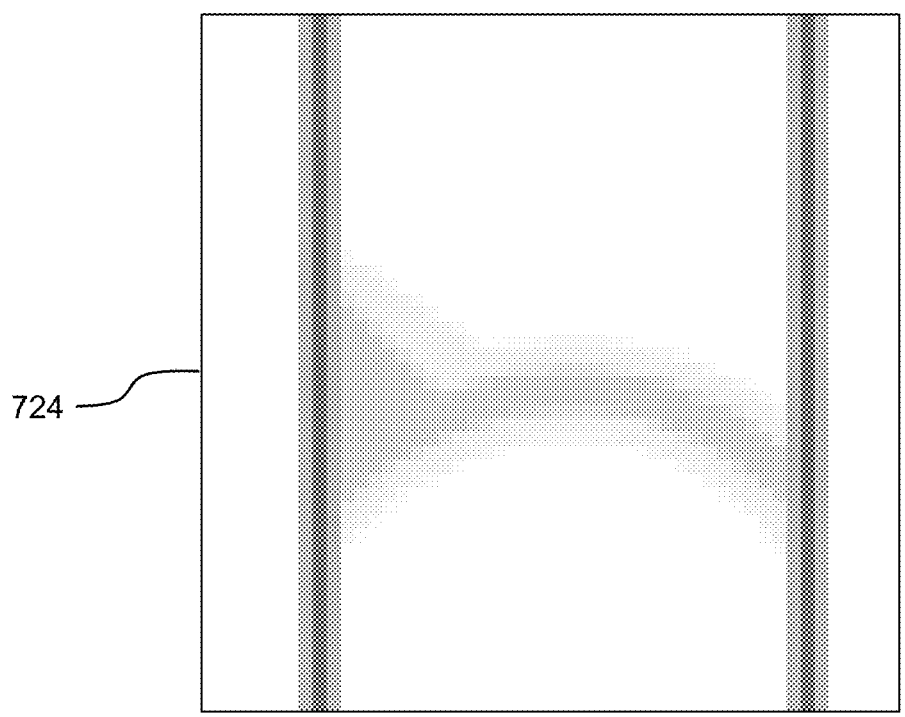
FIG. 7 is a schematic representation of another infrared image of an area of a building surface according to an embodiment of the disclosure.
Figure 8:
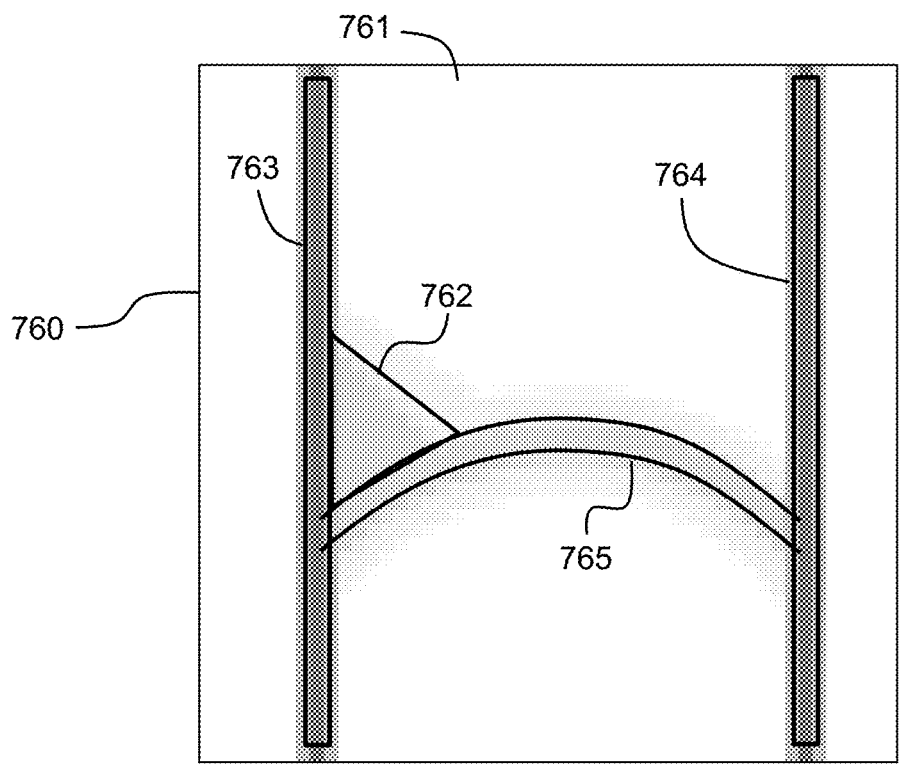
FIG. 8 is a schematic representation of an analysis of the infrared image of FIG. 7 according to an embodiment of the disclosure.
Figure 9:
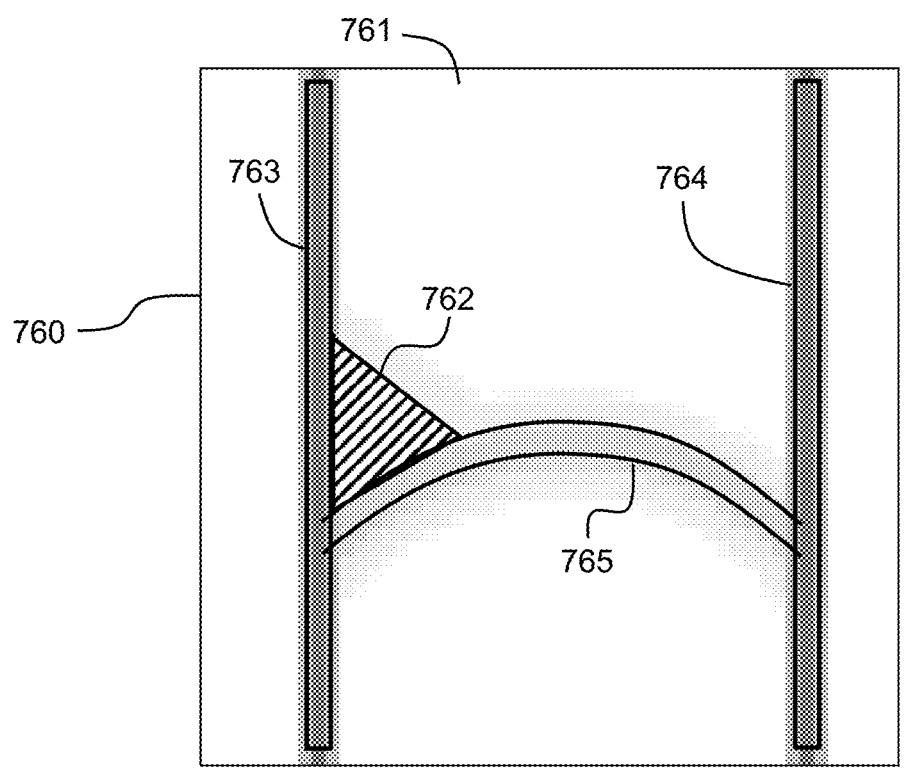
FIG. 9 is a schematic representation of an a further analysis of the infrared image of FIG. 7 according to an embodiment of the disclosure.

FIGS. 7 and 8 illustrate another embodiment including an arc shape that is identified as not corresponding to an insulation void. For example, FIG. 7 shows a schematic representation of an infrared image 724 captured by a thermographic camera of an insulation void detection tool. Further, FIG. 8 shows a schematic representation of an analyzed infrared image 760 after the infrared image 724 is partitioned into regions by a computing device of the insulation void detection tool. The regions of analyzed infrared image 760 include a region 761 that includes the pixels having the most common digital pixel value. A first region 762 has a triangular shape. Region 763 and region 764 are straight vertical regions that are representative of framing elements. Further, region 765 is in the shape of an arc. The area between the framing elements in infrared image 724 that have higher digital pixel values is a complex shape. But computing device ascertains the shape as two overlapping regions, including triangular region 762 that corresponds to an insulation void and arc-shaped region 765 that does not, as shown in FIG. 9.

In certain embodiments of the method of evaluating insulation as otherwise described herein, the method includes determining a volume of the first insulation void based on the size of the first identified region. For example, in certain embodiments, the computing device determines the volume of the identified first insulation void based on the size of the corresponding identified region. Further, in some embodiments, the volume of the void is determined based on the intensity of the digital pixel values of the region and the gradient at the edges of the region. For example, a sharp gradient may be representative of a completely empty area within the cavity of the building surface, while a shallower gradient may be representative of an area where the insulation gradually thins to create a void.

The size of the region in the infrared image may be determined by calculating the overall size of the area that is imaged in the infrared image. Various methods may be used to determine the size of the imaged area. For example, in some embodiments the distance between framing elements in the image is used to determine the overall size of the imaged area. In other embodiments, the size of the image or the regions therein are identified using stereoscopic imaging. In other embodiments, the size of the imaged area is predetermined by consistently capturing the image from a specified distance. Still, in other embodiments, the size of the imaged area is determined by projecting indicia on the building surface and measuring the size of the indicia.

In certain embodiments of the method of evaluating insulation as otherwise described herein, the method includes sending a representation of the infrared image to a display. For example, insulation void detection tool 100 includes a display 102 in data communication with computing device 140. Computing device 140 is operable to transmit a representation of the infrared image 124, as well as other information, to display 102 for outputting the image and/or information to a user. In certain embodiments of the method of evaluating insulation, the display is part of the insulation void detection tool. For example, in insulation void detection tool 100, display 102 is disposed on the outside of the housing 104 of insulation void detection tool 100. In other embodiments, the display is physically separated from the housing of the insulation void detection tool. For example, in some embodiments, the display is part of a notebook computer, a smartphone, or a tablet.

In certain embodiments of the method of evaluating insulation as otherwise described herein, the method includes generating the representation of the infrared image. For example, in some embodiments, the computing device generates an image for a display that is a representation of the infrared image. As explained in more detail below, in some embodiments, the representation of the infrared image includes details that make the infrared energy detected by the thermographic camera more easily discernible by a person. In other embodiments, the representation of the infrared image includes depictions of the partitioned regions.

For example, in some embodiments, generating the representation of the infrared image includes density slicing. As is well understood by those of ordinary skill in the art, variations in light intensity can be difficult for people to perceive. Accordingly, in some embodiments, the representation of the infrared image includes different colors that represent different intensities of detected infrared radiation, or another variation of density slicing.

In certain embodiments of the method of evaluating insulation as otherwise described herein, the representation of the infrared image includes a figure representative of the first identified region. For example, in some embodiments, the representation of the infrared image includes a figure that corresponds to each region of the image that is identified as an insulation void. In some embodiments, the figure is an outline of the region identified as an insulation void. In other embodiments the figure is a solid shape within the representation of the infrared image. In some embodiments, other regions are also presented as figures in the representation of the infrared image. For example, in some embodiments, the regions corresponding to insulation voids are presented in the representation of the infrared image with a first color or pattern, while regions corresponding to framing elements or MEP components are presented with other colors or patterns.

In certain embodiments of the method of evaluating insulation as otherwise described herein, the representation of the infrared image includes the figure representative of the first identified region overlaying a visible light image. For example, in some embodiments, the insulation void detection tool includes a visible light camera that captures a visible light image, or standard picture, of the building surface and overlays the first identified region corresponding to the insulation void onto the visible light image. Such an embodiment provides the information related to the state of the insulation to a viewer of the representation of the infrared image without distracting the user with other information from the infrared image. For example, in some embodiments, the computing device generates an image for display that includes a visible light image of the building surface that is overlaid with the framing elements in one color or pattern, MEP components in another color or pattern, and insulation voids in a third color or pattern.

In certain embodiments of the method of evaluating insulation as otherwise described herein, the method includes sending information indicative of a volume of the first insulation void to a display. For example, in some embodiments the method includes calculating a volume of an identified insulation void, as described above, and sending information indicative of the volume of the insulation void to a display. For example, in some embodiments, the computing device sends a quantitative value of the volume of the void, such as the total volume in cm$^3$. In other embodiments, the computing device sends a Boolean value to the display based on the volume of the void. For example, the Boolean value may indicate whether the insulation void should be addressed through a repair of the insulation. This information may be presented in a variety of different ways, such as displaying the region with a certain color, or assigning a label to the region based on whether filling the insulation void is recommended or unnecessary.

In certain embodiments of the method of evaluating insulation as otherwise described herein, the method includes calculating an insulation quality assessment of the first area of the building surface based on at least one recognized void, including the first void, in the cavity. For example, in some embodiments, the method includes calculating the total volume of insulation void(s) in the area of the infrared image, and determining whether the total volume of insulation voids is above a threshold amount. For example, such a threshold may be indicative of the need to fill one or more of the insulation voids in order for the building surface to be insulated to a desired degree. Thus, in certain embodiments, the method includes calculating a quality assessment of the insulation in the area of the infrared image, and outputting information indicative of whether the insulation within the area should be repaired. Further, in some embodiments, the method includes identifying one or more voids that, if filled with insulation, would provide the area with an acceptable insulation quality assessment.

In some embodiments, the insulation quality assessment is based on a percentage of the first area of the building surface that is occupied by insulation voids. For example, in some embodiments, if voids account for a larger percentage than a predetermined threshold, the insulation quality assessment identifies the area of the building surface within the infrared image as failing to meet a desired insulation criteria. In some embodiments, the method further includes receiving, from an end user, a target quality of the insulating capacity of the building surface, and generating the insulation quality assessment based on the target quality received from the user. For example, in some embodiments, the insulation void detection tool requests information from an end user that relates to the desired insulating capacity of the building surface being assessed. In some embodiments, the requested information is related to a type of building surface that is being assessed, for example, whether the building surface is an interior wall, an exterior wall or a ceiling. In other embodiments, the requested information is related to a desired quality level of the insulation. The computing device then uses the information from the user to determine criteria, for example a value or range of values, for the insulation quality assessment based on the user entered information.

In some embodiments, the user information is entered using an input, such as a keyboard, button, joystick, or touchscreen. In certain embodiments of the method of evaluating insulation, the input is disposed on the housing of the insulation void detection tool. For example, insulation void detection tool 100 includes inputs 106 above handle 108 (FIG. 2). In other embodiments, the input may be remote from the housing. For example, the input may be part of a wireless controller, a notebook computer, a smartphone or a tablet computer.

In another aspect, the disclosure provides a non-transitory computer-readable medium having stored thereon program instructions that upon execution by a processor, cause performance of a set of operations to perform the method of evaluating insulation in a cavity in a building surface of the disclosure. In another aspect, the disclosure provides a computing device including a processor and a non-transitory computer-readable medium having stored thereon program instructions that upon execution by the processor, cause performance of a set of operations to perform the method of evaluating insulation in a cavity in a building surface of the disclosure.

FIG. 2 includes a schematic representation of a computing device 140 included in the insulation void detection tool 100 that includes a non-transitory computer-readable medium with program instructions stored thereon for performing the method of the disclosure. Computing device 140 includes a processor 142, a memory 144, and a network interface 146.

Processor 142 of computing device 140 includes a computer processing element, e.g., a central processing unit (CPU), an integrated circuit that performs processor operations, a digital signal processor (DSP), or a network processor. In some embodiments, the processor includes register memory that temporarily stores instructions being executed and corresponding data, as well as cache memory that temporarily stores performed instructions. Memory 144 is a computer-usable memory, e.g., random access memory (RAM), read-only memory (ROM), or non-volatile memory such as flash memory, solid state drives, or hard-disk drives. In certain embodiments, memory 144 stores program instructions that are executable by processor 142 for carrying out the methods and operations of the disclosure. Network interface 146 provides digital communication between computing device 140 and other computing systems or devices. In some embodiments, the network interface operates via a physical wired connection, such as an ethernet connection. In other embodiments, the network interface communicates via a wireless connection, e.g., IEEE 802.11 (Wifi) or BLUETOOTH. Other communication conventions are also possible.

In another aspect, the disclosure provides an insulation void detection tool including a housing, a thermographic camera disposed in the camera housing and configured to capture an infrared image of a building surface, and a computing device according to the disclosure.

Such an insulation void detection tool is shown in FIG. 2. Insulation void detection tool 100 includes a housing 104, a thermographic camera 120 disposed in housing 104, and a computing device 140. The thermographic camera is configured to capture an image of a building surface, when the building surface is placed within the field of view of the thermographic camera 120, as depicted in FIG. 1.

In certain embodiments of the insulation void detection tool as otherwise described herein, the computing device is disposed in the housing. For example, computing device 140 of insulation void detection tool 100 is disposed within the housing 104. In other embodiments, the computing device is separate from the housing. For example, in some embodiments, the computing device is part of a smartphone, tablet, notebook computer or wearable device. Further, while computing device 140 is a client device, i.e., a device actively operated by the user, in other embodiments, the computing device is a server device, e.g., a device that provides computational services to a client device. Moreover, other types of computational platforms are also possible in embodiments of the disclosure.

In certain embodiments of the insulation void detection tool as otherwise described herein, the insulation void detection tool further includes a display configured to display a representation of the infrared image captured by the thermographic camera. For example, insulation void detection tool 100 includes a display 102 that displays a representation of the infrared image captured by thermographic camera 120. Display 102 may also display other information, such as an insulation quality assessment, as described above, and other information, such as user instructions.

In certain embodiments of the insulation void detection tool as otherwise described herein, the display is disposed on the housing. For example, display 102 of insulation void detection tool 100 is disposed on housing 104. In other embodiments, the display is provided by a device that is separate from the camera and housing, such as by a notebook computer, tablet or smartphone.

In certain embodiments of the insulation void detection tool as otherwise described herein, the insulation void detection tool further includes an input for controlling the computing device. For example, insulation void detection tool 100 includes two inputs 106 for operating the insulation void detection tool. In particular, inputs 106 are used to control computing device 140, for example, to activate thermographic camera 120. Inputs 106 may also be used to provide other information to computing device 140, such as desired criteria for the insulation and/or information about the building surface, including the distance between framing members.

In certain embodiments of the insulation void detection tool as otherwise described herein, the input is disposed on the housing. For example, inputs 106 are disposed on housing 104. In other embodiments, one or more inputs is provided by a device that is separate from the camera and housing, such as by a notebook computer, tablet or smartphone.

In another aspect, the disclosure provides a method of insulating a cavity in a building surface. The method includes aiming the thermographic camera of the insulation void detection tool according to the disclosure toward a first area of a building surface that covers the cavity. The thermographic camera of the insulation void detection tool is activated to capture an infrared image of the first area of the building surface. The method also includes receiving an indication of a first identified region of the infrared image that corresponds to a first insulation void within the cavity of the building surface.

For example, in some embodiments, a user aims the thermographic camera of an insulation void detection tool toward a first area of a building surface, as shown in FIG. 1. The user then activates the thermographic camera, for example by using an input on the insulation void detection tool, to capture an infrared image of the first area of the building surface. The insulation void detection tool then carries out the method of evaluating the insulation in the cavity according to the disclosure. Based on the evaluation, the insulation void detection tool outputs an indication of an identified region of the infrared image that corresponds to an insulation void to the user. For example, in some embodiments, the insulation void detection tool outputs an image of the building surface with the region of the insulation void overlaying the image.

In certain embodiments of the method of insulating the cavity as otherwise described herein, the method further includes, prior to activating the thermographic camera to capture the infrared image, filling a portion of the cavity with insulation. For example, in some embodiments, the insulation void detection tool is used during an installation of insulation into the building surface cavity in order to determine whether the installation has been successful. For example, the user may inject insulation into the building surface cavity and subsequently capture an image of the building surface with the insulation therein. Accordingly, any void identified by the insulation void detection tool can be immediately addressed, during the original installation of the insulation. In other embodiments, the insulation void detection tool is used to identify voids in previously existing insulation in building surfaces.

In certain embodiments of the method of insulating the cavity as otherwise described herein, the insulation is a foam insulation. For example, in some embodiments, the insulation void detection tool is used when injecting foam insulation into a wall cavity, such as an empty wall cavity, or a wall cavity with existing insulation that is being supplemented with foam insulation.

In certain embodiments of the method of insulating the cavity as otherwise described herein, the insulation undergoes an exothermic reaction upon introduction into the cavity. For example, in some embodiments, as the foam insulation cures, it undergoes an exothermic reaction and rises in temperature. For instance, in some embodiments, the insulation will rise in temperature by 5° F. to 60° F. or more. For example, the temperature of the insulation may rise in a range of 5° F. to 60° F., 5° F. to 30° F., 10° F. to 40° F., 15° F. to 45° F., 20° F. to 50° F., 25° F. to 55° F., 30° F. to 60 F, 10° F. to 50° F., 15° F. to 45° F., 20° F. to 40° F., 25° F. to 30° F., 5° F. to 10° F., 10° F. to 15° F., 15° F. to 20° F., 20° F. to 25° F., 25° F. to 30° F., 30° F. to 35° F., 35° F. to 40° F., 40° F. to 45° F., 45° F. to 50° F., 50° F. to 55° F., 55° F. to 60° F., or more than 60° F. This rise in temperature warms the building surface, causing a thermal gradient across the first area of the building surface. In particular, regions of the building surface that are adjacent to the insulation become warmer, whereas regions that are not adjacent to the insulation remain cooler. When the infrared image is captured by the insulation void detection tool, the warmer areas are pronounced in the image and can be used by the tool to identify the location of the insulation, as explained in more detail above.

In certain embodiments of the method of insulating the cavity as otherwise described herein, the thermographic camera is activated while the insulation is at least 5° F. higher than the ambient environment. For example, in some embodiments, the thermographic camera of the insulation void detection tool is activated by the user while the insulation is still warm as a result of the exothermic reaction. In some embodiments, this makes regions where the insulation has been installed more easily identifiable.

In certain embodiments of the method of insulating the cavity as otherwise described herein, the method further includes filling the first insulation void with additional insulation. For example, in some embodiments, the method includes forming an aperture in the building surface so as to provide access to the insulation void, and additional insulation is then introduced to the first insulation void through the aperture. For instance, a tool for injecting insulation can be inserted through the aperture into the cavity at the location of the void. Accordingly, the void can be filled with additional insulation.

EXAMPLES

Figure 10:
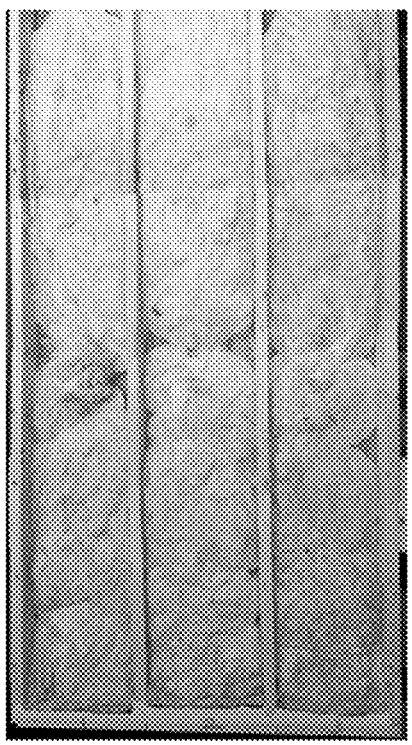
FIG. 10 is an image of a building surface including insulation in a cavity of the building surface.
Figure 11:
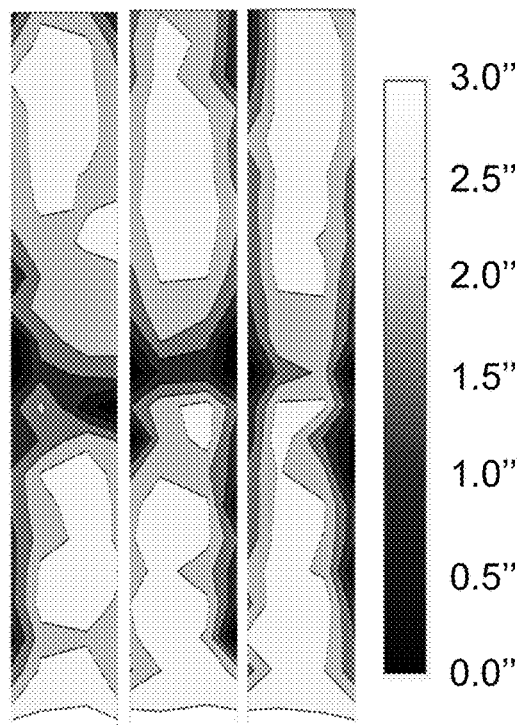
FIG. 11 is a map of the thickness of the insulation in the building surface of FIG. 10.
Figure 12:
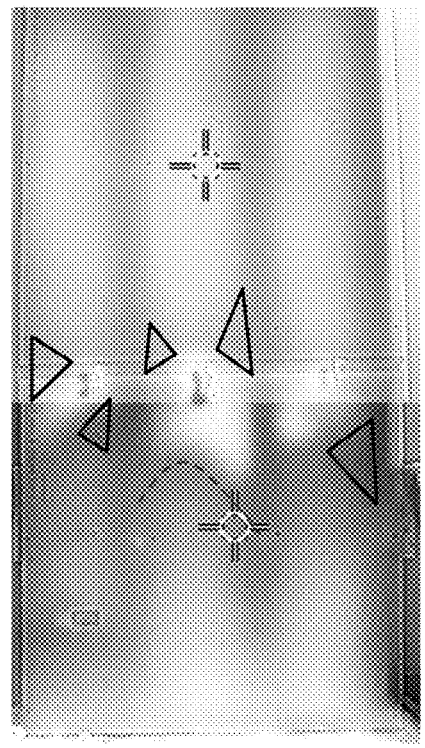
FIG. 12 is an infrared image including a depiction of a method of identifying insulation voids in the building surface of FIG. 10.

FIGS. 10-15 illustrate two examples of an embodiment of a method of evaluating insulation in a cavity of a building surface according the present disclosure. FIG. 10 shows an image of insulation within a cavity of a building surface. The cavity is formed between a rear panel and a front panel, which is removed for the image. The cavity is also bordered and partitioned by framing elements. Foam insulation is included throughout the majority of the cavity. FIG. 11 is a map depicting the thickness of the insulation in the cavity. The thickness was measured by hand over an array of positions across the cavity in order to generate the map shown in FIG. 11. FIG. 12 is an infrared image of the building surface with the front panel intact. FIG. 11 also includes a depiction of insulation voids that are detected according to the method of the disclosure. As illustrated, the insulation voids are correlated with partitioned regions of the infrared image that include triangular shapes.

Figure 13:
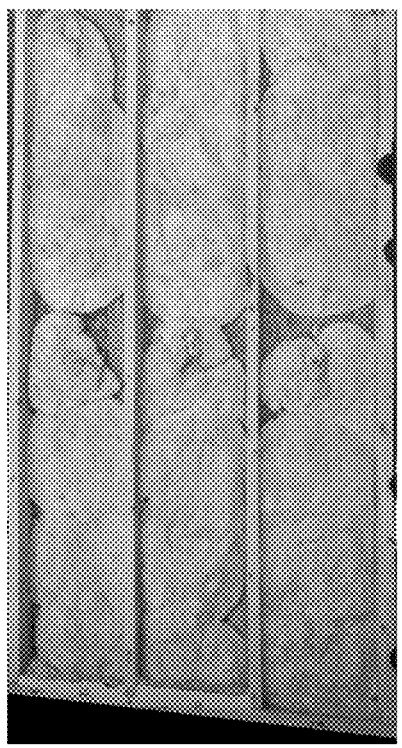
FIG. 13 is an image of a building surface including insulation in a cavity of the building surface.
Figure 14:
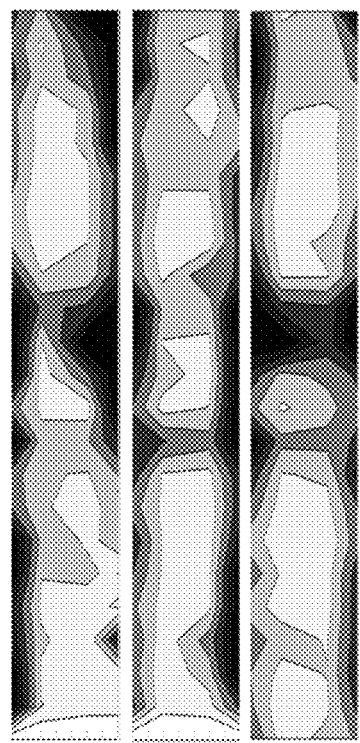
FIG. 14 is a map of the thickness of the insulation in the building surface of FIG. 13.
Figure 15:
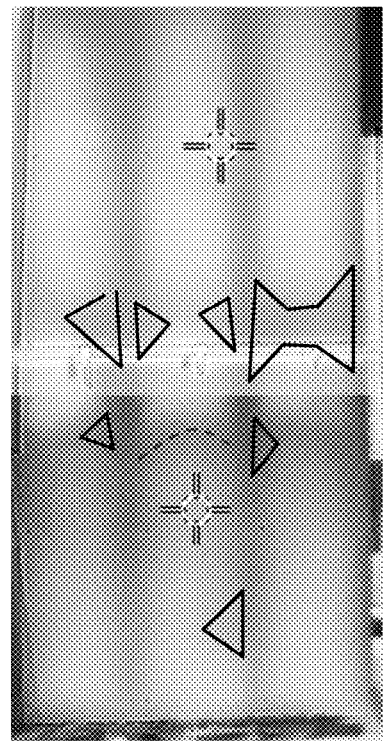
FIG. 15 is an infrared image including a depiction of a method of identifying insulation voids in the building surface of FIG. 13.

FIG. 13 shows another image of insulation within a cavity of another building surface. Again, the cavity is formed between a rear panel and a front panel, which is removed for the image. Similar to the building surface of FIGS. 10-12, the cavity of the building surface in FIG. 13 is bordered and partitioned by framing elements. A map of the foam insulation included in the cavity of FIG. 13 is shown in FIG. 14. Again, the thickness of the foam insulation was measured by hand over an array of positions across the cavity in order to generate the map. FIG. 15 is an infrared image of the building surface of FIG. 13 with the front panel intact. FIG. 15 also includes a depiction of insulation voids that are detected according to the method of the disclosure. As illustrated, the insulation voids are correlated with partitioned regions of the infrared image that include triangular shapes.

Various aspects of the disclosure are further provided by the enumerated embodiments provided below, which can be combined in any number and in any fashion that is not technically or logically inconsistent.

Embodiment 1

A method of evaluating insulation in a cavity in a building surface, the method comprising:
  receiving, via a computing device, an infrared image of a first area of the building surface that covers the cavity, the infrared image including an array of digital pixel values;
  partitioning, using the computing device, the infrared image into a plurality of regions based on the digital pixel values, the plurality of regions including a first identified region;
  determining, using the computing device, a shape of the first identified region using a shape analysis algorithm; and recognizing, using the computing device, that the first identified region corresponds to a first insulation void based on the determined shape of the first identified region.

Embodiment 2

The method according to embodiment 1, wherein the digital pixel values correspond to brightness.

Embodiment 3

The method according to embodiment 1 or embodiment 2, wherein recognizing that the first identified region corresponds to the first insulation void includes determining that the shape of the first identified region includes a triangular portion.

Embodiment 4

The method according to any of embodiments 1 to 3, wherein recognizing that the first identified region corresponds to the first insulation void includes determining that the shape of the first identified region is a triangle.

Embodiment 5

The method according to any of embodiments 1 to 4, wherein the building surface is a wall or ceiling.

Embodiment 6

The method according to any of embodiments 1 to 5, further comprising identifying framing elements in the building surface.

Embodiment 7

The method according to any of embodiments 1 to 6, wherein the first identified region is recognized as the first insulation void if the first identified region diverges toward a framing element.

Embodiment 8

The method according to any of embodiments 1 to 7, wherein the first identified region has a first average digital pixel value, wherein the infrared image of the first area of the building surface has an overall average digital pixel value, and wherein a difference between the first average digital pixel value and the overall average digital pixel value is greater than a predetermined threshold.

Embodiment 9

The method according to any of embodiments 1 to 8, further comprising identifying MEP components in the building surface.

Embodiment 10

The method according to any of embodiments 1 to 9, wherein the plurality of regions includes a second identified region, and the method further includes:
  determining, using the computing device, a shape of the second identified region using the shape analysis algorithm; and
  recognizing, using the computing device, that the second identified region does not correspond to an insulation void based on the determined shape of the second identified region.

Embodiment 11

The method according to embodiment 10, wherein recognizing that the second identified region does not correspond to an insulation void includes determining that the shape of the second identified region is an arc.

Embodiment 12

The method according to any of embodiments 1 to 11, further comprising determining a volume of the first insulation void based on the size of the first identified region.

Embodiment 13

The method according to any of embodiments 1 to 12, further comprising sending a representation of the infrared image to a display.

Embodiment 14

The method according to embodiment 13, further comprising generating the representation of the infrared image.

Embodiment 15

The method according to embodiment 14, wherein generating the representation of the infrared image includes density slicing.

Embodiment 16

The method according to any of embodiments 13 to 15, wherein the representation of the infrared image includes a figure representative of the first identified region.

Embodiment 17

The method according to embodiment 16, wherein the representation of the infrared image includes the figure representative of the first identified region overlaying a visible light image.

Embodiment 18

The method according to any of embodiments 1 to 17, further comprising sending information indicative of a volume of the first insulation void to a display.

Embodiment 19

The method according to any of embodiments 1 to 18, further comprising calculating an insulation quality assessment of the first area of the building surface based on at least one recognized void, including the first void, in the cavity.

Embodiment 20

The method according to embodiment 19, wherein the insulation quality assessment is based on a percentage of the first area of the building surface that is occupied by insulation voids.

Embodiment 21

The method according to embodiment 19 or embodiment 20, further comprising sending the insulation quality assessment of the first area of the building surface to a display.

Embodiment 22

A non-transitory computer-readable medium having stored thereon program instructions that upon execution by a processor, cause performance of a set of operations to perform the method of any of embodiments 1 to 21.

Embodiment 23

A computing device comprising:
a processor; and
a non-transitory computer-readable medium according to embodiment 22.

Embodiment 24

An insulation void detection tool comprising:
a housing;
a thermographic camera disposed in the housing and configured to capture an infrared image of a building surface; and
the computing device according to embodiment 23.

Embodiment 25

The insulation void detection tool according to embodiment 24, wherein the computing device is disposed in the housing.

Embodiment 26

The insulation void detection tool according to embodiment 24 or embodiment 25, further comprising a display configured to display a representation of the infrared image captured by the thermographic camera.

Embodiment 27

The insulation void detection tool according to embodiment 26, wherein the display is disposed on the housing.

Embodiment 28

The insulation void detection tool according to any of embodiments 24 to 27, further comprising an input for controlling the computing device.

Embodiment 29

The insulation void detection tool according to embodiment 28, wherein the input is disposed on the housing.

Embodiment 30

A method of insulating a cavity in a building surface, the method comprising:
aiming the thermographic camera of the insulation void detection tool according to any of embodiments 24 to 29 toward a first area of a building surface that covers the cavity;
activating the thermographic camera of the insulation void detection tool to capture an infrared image of the first area of the building surface;
receiving an indication of a first identified region of the infrared image that corresponds to a first insulation void within the cavity of the building surface.

Embodiment 31

The method according to embodiment 30, further comprising, prior to activating the thermographic camera to capture the infrared image, filling a portion of the cavity with insulation.

Embodiment 32

The method according to embodiment 31, wherein the insulation is a foam insulation.

Embodiment 33

The method according to embodiment 31 or embodiment 32, wherein the insulation undergoes an exothermic reaction upon introduction into the cavity.

Embodiment 34

The method according to embodiment 33, wherein the thermographic camera is activated while the insulation is at least 5° F. higher than the ambient environment.

Embodiment 35

The method according to any of embodiments 30 to 34, further comprising filling the first insulation void with additional insulation.

Embodiment 36

The method according to embodiment 35, further comprising forming an aperture in the building surface so as to provide access to the insulation void, and wherein the additional insulation is introduced to the first insulation void through the aperture.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. A method of evaluating insulation in a cavity in a building surface, the method comprising:
   receiving, via a computing device, an infrared image of a first area of the building surface that covers the cavity, the infrared image including an array of digital pixel values, wherein the infrared image of the first area of the building surface has an overall average digital pixel value;
   partitioning, using the computing device, the infrared image into a plurality of regions based on the digital pixel values, the plurality of regions including a first identified region, wherein the first identified region has a first average digital pixel value, and wherein a difference between the first average digital pixel value and the overall average digital pixel value is greater than a predetermined threshold;
   determining, using the computing device, a shape of the first identified region using a shape analysis algorithm; and
   recognizing, using the computing device, that the first identified region corresponds to a first insulation void based on the determined shape of the first identified region.

2. The method according to claim 1, wherein the digital pixel values correspond to brightness.

3. The method according to claim 1, wherein the building surface is a wall or ceiling.

4. The method according to claim 1, further comprising identifying framing elements in the budding surface.

5. The method according to claim 1, wherein the first identified region is recognized as the first insulation void if the first identified region diverges toward a framing element.

6. The method according to claim 1, further comprising identifying mechanical, electrical and plumbing MEP components in the building surface.

7. The method according to claim 1, wherein the plurality of regions includes a second identified region, and the method further includes:
   determining, using the computing device, a shape of the second identified region usinc the shape analysis algorithm; and
   recognizing, using the computing device, that the second identified region does not correspond to an insulation void based on the determined shape of the second identified region.

8. The method according to claim 1, further comprising determining a volume of the first insulation void based on the size of the first identified region.

9. The method according to claim 1, further comprising sending a representation of the infrared image to a display.

10. The method according to claim 9, wherein the representation of the infrared image includes a figure representative of the first identified region, wherein the representation of the infrared image includes the figure representative of the first identified region overlaying a visible light image.

11. The method according to claim 1, further comprising sending information indicative of a volume of the first insulation void to a display.

12. The method according to claim 1, further comprising calculating an insulation quality assessment of the first area of the building surface based on at least one recognized void, including the first void, in the cavity.

13. The method according to claim 12, wherein the insulation quality assessment is based on a percentage of the first area of the building surface that is occupied by insulation voids.

14. A non-transitory computer-readable medium having stored thereon program instructions that upon execution by a processor, cause performance of a set of operations to perform the method of claim 1.

15. A computing device comprising:
   a processor; and
   a non-transitory computer-readable medium according to claim 14.

16. An insulation void detection tool comprising:
   a housing;
   a thermographic camera disposed in the housing and configured to capture an infrared image of a building surface; and
   the computing device according to claim 15.

17. A method of insulating a cavity in a building surface, the method comprising:
   aiming the thermographic camera of the insulation void detection tool according to claim 16 toward a first area of a building surface that covers the cavity;

activating the thermographic camera of the insulation void detection tool to capture an infrared image of the first area of the building surface;

receiving an indication of a first identified region of the infrared image that corresponds to a first insulation void within the cavity of the building surface.

18. A method of evaluating insulation in a cavity in a building surface, the method comprising:

receiving, via a computing device, an infrared image of a first area of the building surface that covers the cavity, the infrared image including an array of digital pixel values;

partitioning, using the computing device, the infrared image into a plurality of regions based on the digital pixel values, the plurality of regions including a first identified region;

determining, using the computing device, a shape of the first identified region using a shape analysis algorithm; and recognizing, using the computing device, that the first identified region corresponds to a first insulation void based on the determined shape of the first identified region, wherein recognizing that the first identified region corresponds to the first insulation void includes determining that the shape of the first identified region includes a triangular portion.

19. A method of evaluating insulation in a cavity in a building surface, the method comprising:

receiving, via a computing device, an infrared image of a first area of the building surface that covers the cavity, the infrared image including an array of digital pixel values;

partitioning, using the computing device, the infrared image into a plurality of regions based on the digital pixel values, the plurality of regions including a first identified region and a second identified region;

determining, using the computing device, a shape of the first identified region using a shape analysis algorithm;

determining, using the computing device, a shape of the second identified region using the shape analysis algorithm;

recognizing, using the computing device, that the first identified region corresponds to a first insulation void based on the determined shape of the first identified region;

recognizing, using the computing device, that the second identified region does not correspond to an insulation void based on the determined shape of the second identified region, wherein recognizing that the second identified region does not correspond to an insulation void includes determining that the shape of the second identified region is an arc.

* * * * *